(12) United States Patent
Billy et al.

(10) Patent No.: US 10,497,993 B2
(45) Date of Patent: Dec. 3, 2019

(54) METHOD FOR RECYCLING THE ELECTROLYTE OF A LI-ION BATTERY AND METHOD FOR RECYCLING LI-ION BATTERIES

(71) Applicant: Commissariat a l'Energie Atomique et aux Energies Alternatives, Paris (FR)

(72) Inventors: Emmanuel Billy, Grenoble (FR); Richard Laucournet, La Buisse (FR)

(73) Assignee: Commissariat a l'Energie Atomique et aux Energies Alternatives, Paris (FR)

( * ) Notice: Subject to any disclaimer, the term of this patent is extended or adjusted under 35 U.S.C. 154(b) by 377 days.

(21) Appl. No.: 15/326,778

(22) PCT Filed: Jul. 21, 2015

(86) PCT No.: PCT/IB2015/055518
§ 371 (c)(1),
(2) Date: Jan. 17, 2017

(87) PCT Pub. No.: WO2016/012943
PCT Pub. Date: Jan. 28, 2016

(65) Prior Publication Data
US 2017/0207503 A1     Jul. 20, 2017

(30) Foreign Application Priority Data
Jul. 22, 2014  (FR) .................................... 14 57082

(51) Int. Cl.
*H01M 10/54*      (2006.01)
*H01M 10/0525*    (2010.01)
*H01M 10/0568*    (2010.01)

(52) U.S. Cl.
CPC ....... *H01M 10/54* (2013.01); *H01M 10/0525* (2013.01); *H01M 10/0568* (2013.01); *H01M 2300/0025* (2013.01)

(58) Field of Classification Search
None
See application file for complete search history.

(56) References Cited

U.S. PATENT DOCUMENTS 5,352,270 A    10/1994  Shackle

FOREIGN PATENT DOCUMENTS

EP   0613198 A1   8/1994
KR   2014-0082077 7/2014

OTHER PUBLICATIONS

International Search Report issued in corresponding International Patent Application No. PCT/IB2015/055518 dated Dec. 15, 2015.

*Primary Examiner* — Wyatt P McConnell
(74) *Attorney, Agent, or Firm* — Morgan, Lewis & Bockius LLP (57) ABSTRACT

The invention relates to a method for recycling the electrolyte of a lithium-ion battery and a method for recycling lithium-ion batteries. The method for recycling an electrolyte of the invention is a method for recycling an electrolyte containing a lithium salt of formula LiA, where A represents an anion selected from $PF_6$, $CF_3SO_3$, $BF_4$, $ClO_4$ and $[(CF_3SO_2)_2]N$ of a Li-ion battery, characterized in that it comprises the following steps: a) optionally, treatment of the battery in order to recover the electrolyte that it contains; b) addition of water to the electrolyte; c) optionally, when step a) is carried out, filtration (F1) in order to separate the liquid phase containing the electrolyte from the solid phase comprising the residues of the battery; d) addition of an additional organic solvent to the liquid phase obtained in step b) or, when step a) is carried out, after the filtration (F1) of step c); e) decantation of the liquid phase obtained after step b) of adding water or step d) of adding additional organic (Continued)

solvent, whereby an aqueous phase containing the lithium salt and an organic phase containing the electrolyte solvents and the additional organic solvent are obtained; f) distillation of the organic phase obtained in step e) in order to separate the solvents of the electrolyte and the additional organic solvent; g) precipitation of the anion A of the lithium salt by addition of pyridine followed by filtration (F2); h) addition of at least one carbonate salt and/or of at least one phosphate salt to the filtrate obtained in step g) followed by filtration (F3 whereby a lithium salt and water are obtained. The invention finds its application in the field of recycling lithium-ion batteries, and more particularly the electrolyte of such batteries.

14 Claims, 6 Drawing Sheets

METHOD FOR RECYCLING THE ELECTROLYTE OF A LI-ION BATTERY AND METHOD FOR RECYCLING LI-ION BATTERIES

The invention relates to a method for recycling the electrolyte of a lithium-ion battery. It also relates to a method for recycling lithium-ion batteries.

Lithium-ion (Li-ion) batteries have many applications, notably in the field of electric and hybrid vehicles, mobile electronics, such as mobile telephones, portable computers, cameras, camcorders, GPS location systems, etc.

These numerous applications require the use of a large quantity of batteries. The question of recycling used batteries therefore arises.

In recent decades, manufacturers have been paying more and more attention to the environmental aspects of the manufacture and destruction of products. There is particular interest in the recovery and recycling of these products, both to maintain ecological equilibrium and to reduce costs.

These principles of recovery and recycling are already widely applied in the field of batteries, in view of their extensive use.

In particular, rapid development of electric vehicles requires the provision of methods for battery recovery and recycling that comply with the regulatory framework and meet the economic and environmental challenges. Generally, processing has almost exclusively involved materials with higher added value, for example insertion materials for positive electrodes based on cobalt and/or nickel.

As the regulatory constraints become stricter, electrolyte recovery represents a real source for value enhancement from economic and environmental aspects.

At present there are several types of methods for recycling Li-ion batteries, the main ones being: recycling by thermal treatment, recycling to ionic liquid medium, hydrometallurgical recycling and recycling by organic treatment.

Patents TW501294, JP10046266, JP10158751 and JP10074539 disclose methods for battery recycling by thermal treatment.

Patent TW501294 describes a method for recovery of waste from Li-ion batteries that is carried out in a furnace and leads to decomposition of the organic electrolyte. This method comprises several steps of physical and chemical separation, which lead to recovery of lithium in the form of carbonate.

Patents JP10046266, JP10158751 and JP10074539A disclose methods in which the organic compounds are burnt, recovering just the nickel, cobalt and lithium.

None of these thermal methods allows the organic compounds to be recovered. Moreover, they are energy-consuming and in particular they generate gases and fine particles that are toxic to humans and the environment.

Patent application EP2410603 A1 discloses a method for recycling Li-ion batteries in a ionic liquid medium. This method is a method for recovery of the organic electrolyte and the lithium hexafluorophosphate salt (LiPF6) in lithium-ion batteries. In that method, the battery electrolyte is brought into contact with a phosphonium chloride, leading to the formation of a solid phase by precipitation of lithium in the form of lithium chloride and formation of a liquid phase comprising the carbonates and the ionic liquid (phosphonium hexafluorophosphate). After solid/liquid separation, water is added to the solution of carbonate and ionic liquid, leading to formation of two immiscible phases. A first phase contains predominantly water and the carbonates. The second phase is made up of phosphonium hexafluorophosphate. Then each phase is purified independently by vacuum distillation to extract the water from the carbonates and from the ionic liquid.

This method does not describe the phase of extracting the electrolyte from the battery, which is indispensable for recovering the organic solvents and the lithium salt $LiPF_6$. In the case when the electrolyte is extracted using phosphonium chloride, the latter does not allow the lithium salt to be separated from the battery elements. In fact, this would lead to precipitation of lithium chloride. Moreover, the presence of the ionic liquid will cause impurities to be generated both in the liquid phase and in the battery components of the solid phase, which will then have to be purified.

Patent applications US 2012/03121126 A1 and WO02005101564 A1 disclose hydrometallurgical methods of recycling.

Document US 2012/0312126 A1 describes a method for recovery of the metals from lithium ion batteries. After dismantling and sorting the battery elements, the elements undergo acid attack, which extracts the lithium and the transition metals. The acid solution is then treated by dialysis with a membrane that is permeable to the anions, in order to separate the cobalt from the lithium. Finally, the lithium is precipitated as lithium carbonate and the cobalt as cobalt hydroxide.

This method does not allow the battery electrolyte to be treated, and is interested exclusively in the elements with higher added value (Co, Ni, Cu, Al).

For its part, document WO02005101564 A1 describes a method for recovery of lithium-based batteries, which are submitted to dry grinding in inert atmosphere. Following this, the ground products are sorted and treated by a hydrometallurgical process. The cobalt and the chips containing lithium are washed with water, thus releasing the precipitated lithium. The chips are treated by acid attack to recover the cobalt. The hexafluorophosphate anions are recovered in the form of a complex with $[Ni(NH_3)_6]^{2+}$ or with dihydro-1,4-diphenyl-3,5-phenylimino-1,2,4-triazole.

This method does not allow simultaneous recovery of lithium, hexafluorophosphate and the organic carbonates from the electrolyte.

Documents US006329096 and CA23131173 A1 disclose methods for recycling Li-ion batteries by organic and aqueous treatment.

U.S. Pat. No. 6,329,096 describes a method and an apparatus for recovery of primary and secondary batteries comprising at least a cathode, an anode and an electrolyte sealed in an accumulator cell. The first step of the method consists of removing the accumulator cell from the battery while ensuring that it is made safe. For this, the ionic conductivity between the cathode and the anode is lowered by cooling the pile to temperatures below the solidification point of the electrolyte or the glass transition temperature, generally between 0 and −20° C. The battery is then cut open in order to remove these components and extract the solution from the solid part. Extraction of the electrolyte is provided by negative pressure between the interior and the exterior of the accumulator cell.

Finally, the components are sorted individually for recovery. To recover the electrolyte from the battery, cleaning with an organic solvent is recommended. This step precedes fractional distillation to separate water, derived from cutting at high pressure, from the battery electrolyte. The recommended organic solvent must not form an azeotrope with water. Examples of solvent are methanol, acetone, 1,2-propanediol, dimethyl sulfoxide, gamma-butyrolactone, ethylene carbonate and propylene carbonate.

This method is not interested in recovery of the lithium salt from the electrolyte but only in separation of the organic solvents and water by fractional distillation. In the presence of a salt of the $LiPF_6$ type, fractional distillation will inevitably lead to degradation of the $PF_6^-$ anions to toxic gases of the $PF_5$ and HF type. Moreover, their presence will lead to reactions of degradation of the solvents present during distillation. Thus, the lithium salt and the organic solvents will be degraded.

Patent application CA2313173 A1 describes a method for recovery of lithium ion batteries in which the batteries are first cut open under an inert atmosphere. Then they are treated with a first organic solvent (acetonitrile) in order to extract the electrolyte (in the absence of water). The mixture is then evaporated for separate recovery of the battery electrolyte and the acetonitrile, which can be used again.

U.S. Pat. No. 0,613,198 A1 describes a method for recovery of the materials from Li-ion batteries with a nonaqueous electrolyte. The method aims to treat both the materials and the organic electrolyte. The battery is cut open in order to avoid ignition of the latter. The electrolytic solution is extracted either with i) an organic solvent or with ii) an aqueous solution. In the case of extraction with an organic solvent, it is made safe under an inert atmosphere. Extraction is followed by solid/liquid filtration. The liquid is treated by a succession of distillation and purification. In the case of extraction with water, it is made safe by cutting open under a high-pressure water jet. Then solid/liquid separation is carried out. The solid components of the battery are immersed in an organic solvent (methanol) that does not form an azeotrope with water. Then the solutions are mixed together, leading to precipitation of the lithium in the form of lithium hydroxide. After solid/liquid separation, the solution is distilled under reduced pressure and a succession of fractional distillations is carried out in order to purify the solution and separate the solvents.

The two methods described above involve a step of recovery of the electrolyte that requires fractional distillation for separating the electrolyte (organic solvents and lithium salt) and the extraction solvent. None of the treatment schemes relates to the degradation of the anion of the lithium salt, in particular $PF_6^-$. Now, the presence of this anion during distillation will inevitably cause destruction of the anion. In particular, degradation of the $PF_6^-$ anions generates toxic substances such as hydrogen fluoride (HF), pentafluorophosphate ($PF_5$), and phosphoryl fluoride ($POF_3$), which are extremely harmful and dangerous to humans and the environment. Moreover, the presence of HF and $PF_5$ leads to degradation of the solvents present during distillation. Thus, the lithium salt and the organic solvents will be degraded considerably. Consequently, these methods are not suitable for recycling battery electrolytes containing, in particular, the salt lithium hexafluorophosphate $LiPF_6$, which is the salt most used in Li-ion batteries.

Thus, none of the methods known at present makes it possible to treat the anion of the lithium salt, in particular hexafluorophosphate. This anion is of crucial importance as it breaks down into toxic species, which in their turn cause degradation of the battery electrolyte.

Consequently, none of the methods for recycling the electrolyte of Li-ion batteries, or methods for recycling Li-ion batteries, known at present, allows recycling making it possible both to isolate the lithium salts and isolate separately each of the electrolyte solvents in order to reuse them in a closed cycle and treat the anion of the lithium salts, and in particular the hexafluorophosphate anion.

The technical problem that the present invention proposes to solve is therefore to provide a method for recycling the electrolyte of a Li-ion battery, as well as a method for recycling Li-ion batteries, making it possible both to isolate the lithium salts from the electrolyte and from the electrodes, isolate the solvents of the electrolyte separately, avoiding degradation of the various compounds, but also upgrade the anions of the lithium salts in the form of a product usable for synthesizing the lithium salt again.

The aim of the present invention is therefore to provide a method for recycling the electrolyte of a Li-ion battery and a method for recycling Li-ion batteries, which solve the aforementioned problems encountered in the prior art.

Thus, the present invention relates firstly to a method for recycling an electrolyte containing a lithium salt of formula LiA, where A represents an anion selected from $PF_6^-$, $CF_3SO_3^-$, $BF_4^-$, $ClO_4^-$ and $[(CF_3SO_2)_2]N^-$ of a Li-ion battery, characterized in that it comprises the following steps:

a) optionally, processing the battery to recover the electrolyte that it contains;

b) adding water to the electrolyte;

c) optionally, when step a) is employed, filtration (F1) to separate the liquid phase containing the electrolyte from the solid phase comprising the residues of the battery;

d) adding an organic solvent of addition to the liquid phase obtained in step b) or, when step a) is employed, after filtration (F1) in step c);

e) decanting the liquid phase obtained after step b) of adding water or step d) of adding organic solvent of addition, whereby an aqueous phase containing the lithium salt and an organic phase containing the electrolyte solvents and the organic solvent of addition are obtained;

f) distilling the organic phase obtained in step e) to separate the solvents from the electrolyte and the organic solvent of addition;

g) precipitating anion A of the lithium salt by addition of pyridine and then filtration (F2);

h) adding at least one carbonate salt and/or of at least one phosphate salt to the filtrate obtained in step g) and then filtration (F3), whereby a lithium salt and water are obtained.

In a first variant, this method comprises step a), and said step a) and step b) are carried out at the same time, by cutting up the battery under a high-pressure water jet.

According to a second variant, this method comprises step a), which is carried out by grinding the battery in a chamber under an inert atmosphere.

According to a third variant, this method comprises step a), which is a step of grinding the battery under an inert atmosphere; step d) of adding organic solvent of addition is carried out either during step a), or just after step a), step c) of filtration (F1) is carried out after step d), and step b) of adding water is carried out after step c) of filtration (F1).

In all the variants of this method, preferably the organic solvent of addition is a slightly polar aprotic organic solvent having a solubility below 20 $gL^{-1}$ in water, a solubility of 100% in the organic solvents of the electrolyte without forming azeotropes and a boiling point between 20 and 150° C.

Moreover, in all the variants of this method, the organic solvent of addition is preferably selected from:
dichloromethane,
acetates, selected from butyl acetate, hexyl acetate, ethyl acetate, tert-butyl acetate;
ethers, selected from 2-methoxy-2-methylpropane, 2-ethoxy-2-methylpropane, 2-methoxy-2-methylbutane, and ketones, preferably butanone.

Still in all the variants of this method, preferably the organic solvent of addition obtained after distillation of the organic phase in step f) is recycled in step d).

In the same way, preferably the decanting step e) is repeated.

Also preferably, the water obtained in step h) is recovered to be reused in step b).

The invention also proposes a method for recycling a Li-ion battery, comprising a step of recycling the electrolyte of the Li-ion battery according to the invention.

This method preferably further comprises step a) of treatment of the battery and step c) of filtration (F1), and a step a1) in which the solids obtained after filtration (F1) are washed with water, followed by a step a2) of filtration (F4) for separating the liquid phase from the solid phase and a step a3) of mixing the liquid phase obtained in step a2) before the decanting step e) of the method for recycling the electrolyte.

According to a preferred feature of the methods of the present invention, the solvent of the electrolyte comprises a binary or ternary mixture of cyclic carbonates selected from ethylene carbonate, propylene carbonate and butylene carbonate, linear or branched carbonates selected from dimethyl carbonate, diethyl carbonate, ethyl methyl carbonate and dimethoxyethane, in which a lithium salt is dissolved, selected from lithium hexafluorophosphate, lithium trifluoromethanesulfonate, lithium perchlorate and lithium tetrafluoroborate.

The invention will be better understood and other advantages and features thereof will become clearer on reading the following detailed description, which refers to the appended figures, in which.

The method for recycling the electrolyte of a Li-ion battery according to the invention applies to electrolytes comprising:
- a lithium salt of formula A-Li, in which A is an anion selected from a hexafluorophosphate anion ($PF_6^-$), trifluoromethanesulfonate ($CF_3SO_3^-$), perchlorate ($ClO_4^-$), tetrafluoroborate ($BF_4^-$) and bis(trifluoromethane)sulfonimide [$(CF_3SO_2)_2]N^-$,
- a solvent that is a binary or ternary mixture of cyclic carbonates selected from ethylene carbonate, propylene carbonate and butylene carbonate; linear or branched carbonates selected from dimethyl carbonate, diethyl carbonate, ethyl methyl carbonate; and dimethoxyethane.

The electrolyte of a Li-ion battery to be recycled by the method of the invention may be an electrolyte that is judged to be noncompliant after its manufacture or storage and that has never actually been used in a battery.

It may also be from a battery that has or has not been used. In this case, the electrolyte must be separated from the battery.

For this, the electrolyte may be aspirated or else recovered from the battery by pouring.

Figure 1:
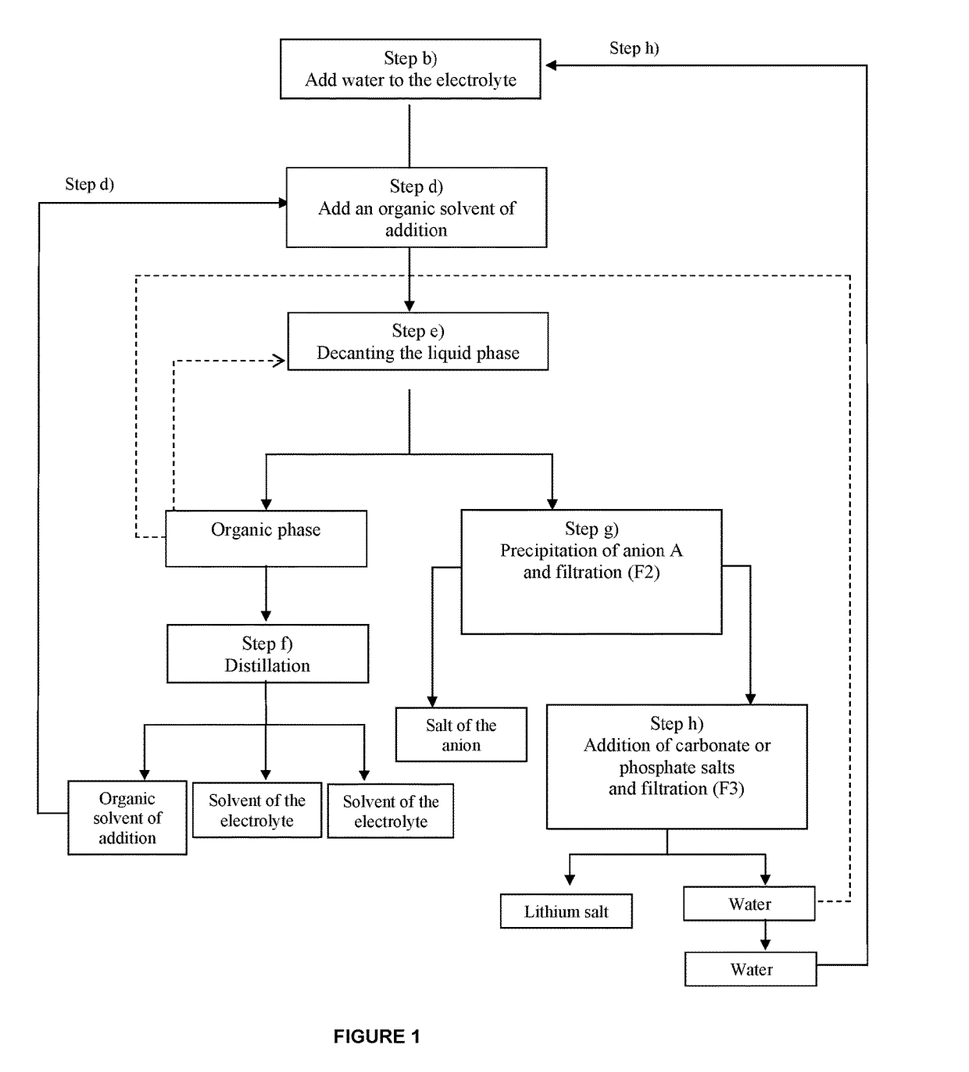
FIG. 1 is a flowchart illustrating an embodiment of the method for recycling an electrolyte according to the invention, said electrolyte comprising lithium hexafluorophosphate and obtained from a Li-ion battery. In this embodiment, step a) of treatment of the battery to recover the electrolyte and step c) of filtration (F1) are not used.
Figure 2:
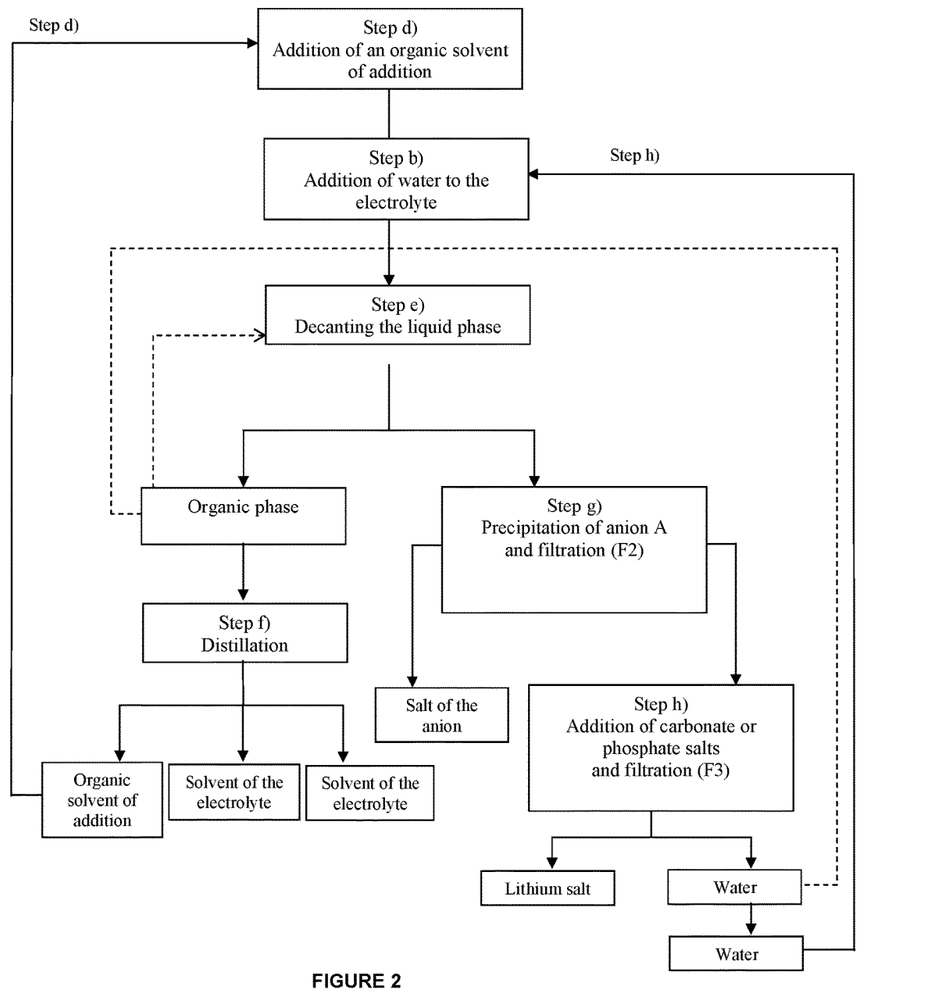
FIG. 2 is a flowchart illustrating an embodiment of the method for recycling an electrolyte according to the invention, said method not comprising steps a) and c)

In these cases, the step designated a) of treatment of the battery and the step designated c) of filtration (F1) for separating the liquid phase from the solid phase are not employed and the method for recycling according to the invention then only comprises the steps shown in FIGS. 1 and 2, i.e. steps b) and d) to h).

Thus, in a first embodiment, shown in FIG. 1, the method for recycling an electrolyte according to the invention comprises adding water to the electrolyte in step b) in FIG. 1, followed by a step designated d) in FIG. 1, of adding an organic solvent of addition to the phase obtained in step b).

Then a decanting step, designated e) in FIG. 1, is carried out on the phase obtained in step d).

The aqueous phase and organic phase are then treated separately, as will be explained hereunder, by the steps designated f) to h) in FIG. 1. These steps are identical in all the embodiments and all the variants of the method for recycling an electrolyte according to the invention.

In a second embodiment, shown in FIG. 2, the method for recycling an electrolyte according to the invention comprises a first step designated d) in FIG. 2, addition of an organic solvent of addition to the electrolyte, followed by the step designated b) in FIG. 2 of addition of water to the phase obtained in step b).

Then a decanting step, designated e) in FIG. 2, is carried out. The steps designated f) to h) in FIG. 2 are then carried out on the aqueous and organic phases.

Figure 3:
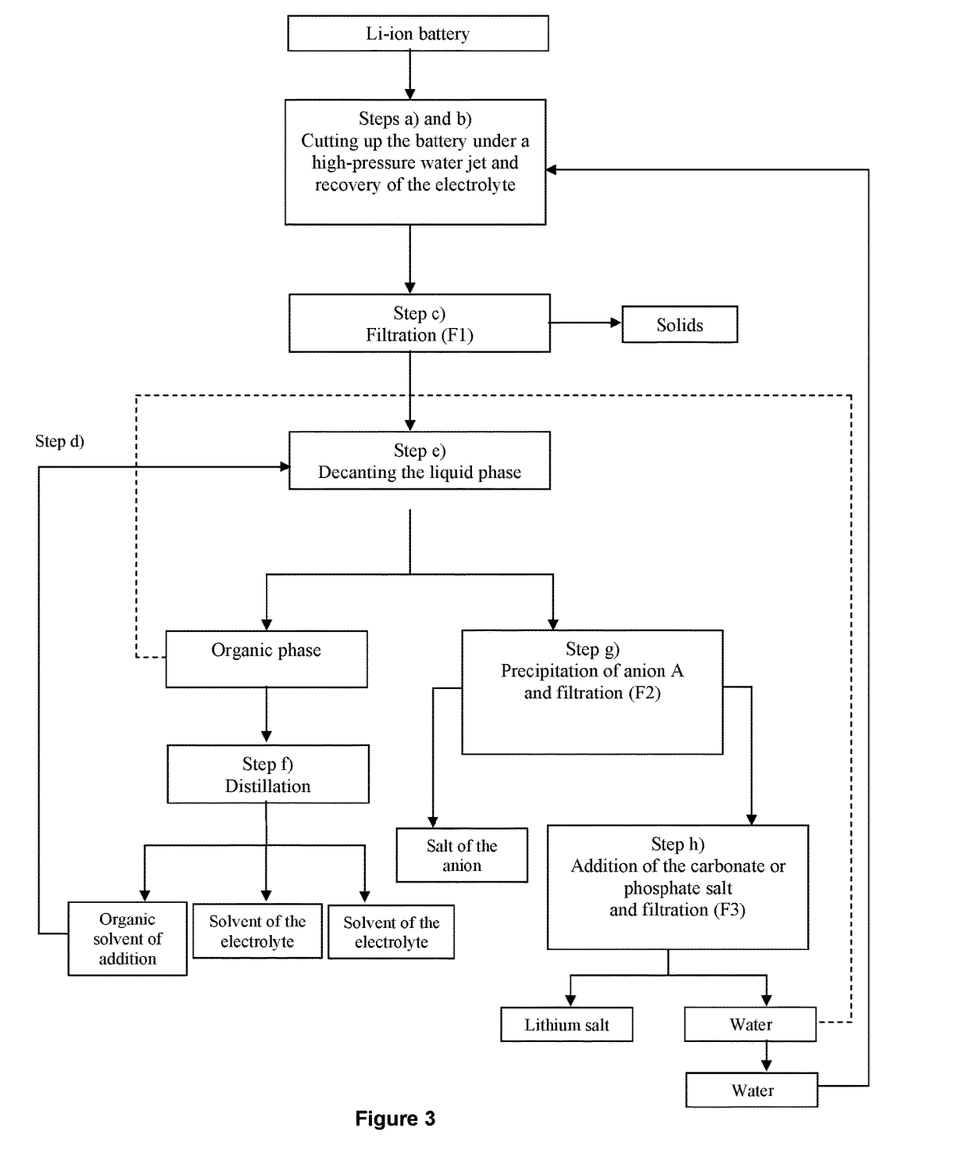
FIG. 3 is a flowchart illustrating an embodiment of the method for recycling an electrolyte according to the invention, comprising steps a) and c)
Figure 4:
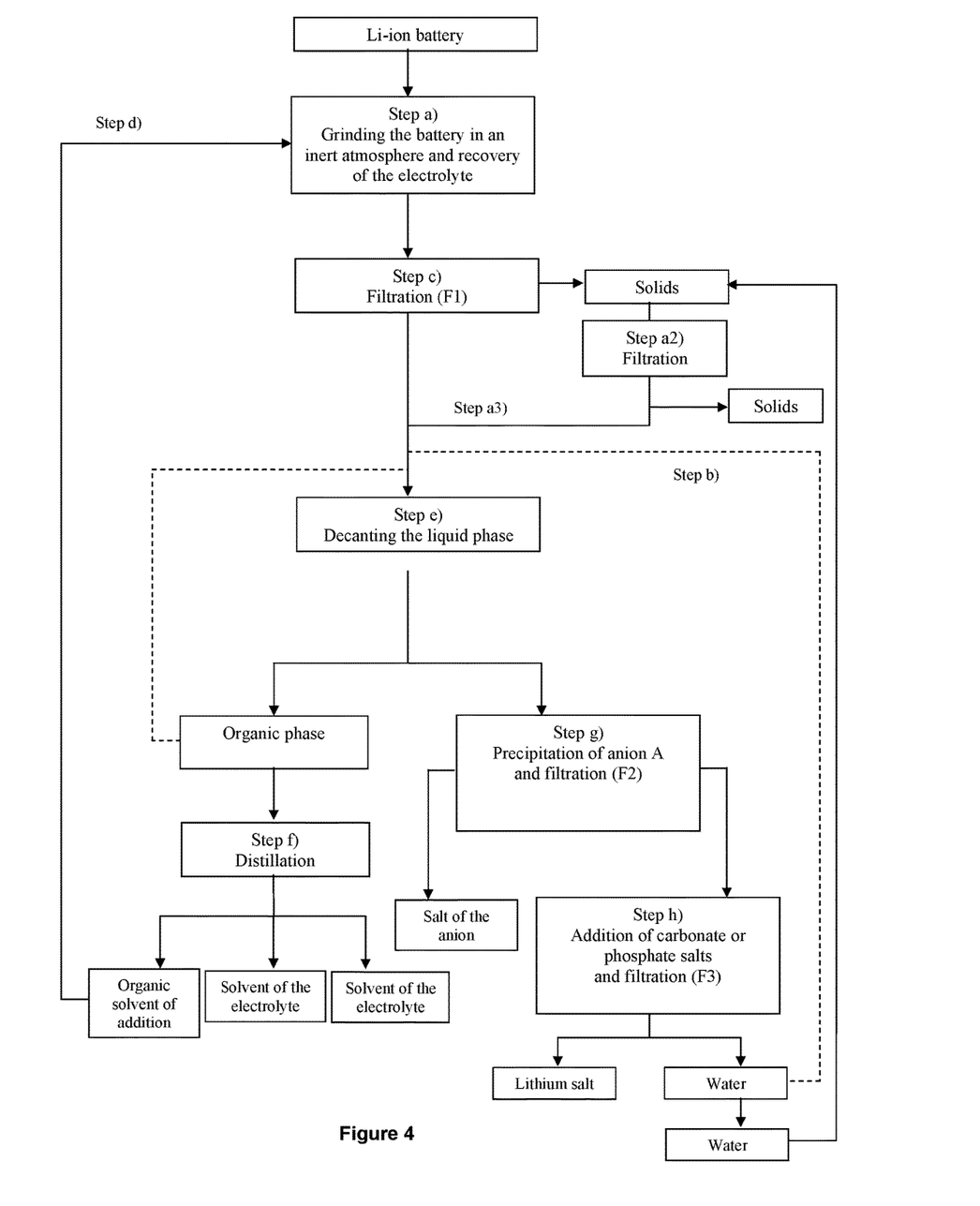
FIG. 4 is a flowchart illustrating another embodiment of the method for recycling according to the invention, said electrolyte being obtained from a Li-ion battery, and said method comprising steps a) and c)

However, to recover more electrolytes, the electrolyte may also be extracted by treatment of the battery, for example by grinding or cutting up the battery. In this case, the method according to the invention for recycling the electrolyte comprises steps a) and c), as shown in FIGS. 3 and 4.

Steps b) and d) to h), in this case, are identical to steps b) and d) to h) of the embodiments of the method of recycling according to the invention, of an electrolyte without treatment of the battery.

Steps a) to h) relate to FIGS. 1 to 4, in which the same reference symbols indicate the same steps.

Thus, the method for recycling the electrolyte then comprises a step a) of treatment of the battery to recover the electrolyte. This step a) makes it possible to open the battery in conditions that avoid its ignition. This step a) is optional.

According to a first embodiment, as indicated in the flowchart in FIG. 3, this step a) is carried out by cutting open the battery under a high-pressure water jet above 6000 bar. The high pressure of the water prevents heating during cutting.

In this first embodiment, step b) of adding water is therefore carried out at the same time as step a) of treatment of the battery for recovery of the electrolyte.

Then, in step c), the liquid phase obtained in steps a) and b) is filtered (filtration F1) to separate the liquid phase, containing the electrolyte, from the solid phase, comprising the rest of the battery.

Then, in step d), an organic solvent of addition is added to the filtrate obtained after filtration (F1). This organic solvent of addition makes it possible to separate this filtrate obtained by decanting, in step e), into two phases, an aqueous phase containing the lithium salt, and an organic phase containing the solvents of the electrolyte and the organic solvent of addition.

The organic solvent of addition is a slightly polar aprotic organic solvent, i.e. whose polarity is close to that of dichloromethane. It must be sparingly soluble in water, i.e. have a solubility below 20 g/$L^{-1}$, and be 100% soluble, i.e. we must not obtain two separate phases in the organic solvents of the electrolyte of the Li-ion battery. Moreover, the organic solvent of addition must not form an azeotrope with the organic solvents of the battery and must have a relatively low boiling point, preferably between 30° C. and 150° C.

Preferably, the organic solvent of addition is selected from dichloromethane; butyl acetate, hexyl acetate, ethyl acetate, tert-butyl acetate; ethers, in particular 2-methoxy-2-methylpropane, 2-ethoxy-2-methylpropane, 2-methoxy-2-methylbutane; and ketones, preferably butanone.

The decanting in step e) is carried out at room temperature. In the case when the organic phase still contains traces of the lithium salt, the decanting step may be repeated after treatment of the aqueous phase, until the desired purity is obtained.

Then, in step f), the organic solvents of the electrolyte and the organic solvent of addition are separated by distillation under reduced pressure, typically of about 100 mbar. The absence of formation of an azeotrope makes it possible to recover each solvent in pure form.

The organic solvents of the battery electrolyte thus recovered can be reused in the manufacture of electrolyte for new batteries. The organic solvent of addition may, for its part, be reused in the method for recycling the electrolyte according to the invention, in step d).

In addition, the aqueous phase is treated as follows: anion A of the lithium salt is precipitated in step g). Then filtration is carried out (filtration F2) to recover the precipitate.

When anion A is the hexafluorophosphate anion, precipitation is carried out by adding pyridine. Addition of pyridine makes it possible to obtain a compound of formula $C_5H_5NHPF_6$. This compound has the advantage that it is stable in air and can be converted into lithium hexafluorophosphate salt ($LiPF_6$).

Thus, using the method of the invention, the anion, in this case hexafluorophosphate that is liable to degrade into toxic species that may cause degradation of the battery electrolyte, is recovered and converted into lithium salt.

Next, in step h) of the method for recycling the electrolyte of the present invention, at least one carbonate salt d) or lithium phosphate is formed by adding, to the filtrate obtained in step g), at least one carbonate salt a) or at least one phosphate salt or $CO_2$.

The carbonate salt or phosphate salt are selected from calcium, sodium or ammonium phosphate or carbonate.

It will also be possible to use bubbling of $CO_2$ to form a lithium carbonate salt.

At the end of step h), a lithium carbonate or phosphate and water are obtained, which are separated by filtration (F3).

The lithium salt can be used again in the manufacture of a Li-ion battery and the water is reused in the method of recycling according to the invention, in step b).

According to a second embodiment of the method for recycling an electrolyte according to the invention, step a) of treatment of the battery for recovery of the electrolyte is carried out by grinding the battery in a chamber under an inert atmosphere. Grinding must be carried out in a chamber, under a controlled atmosphere and pressure, the inert gas preferably being selected from argon, nitrogen, neon, krypton or helium.

Recovery of the electrolyte in step a) is followed by step b) of adding water and the other steps as indicated in the flowchart in FIG. 1.

According to a third embodiment of the method for recycling an electrolyte according to the invention, illustrated in FIG. 4, step a) of treatment of the battery for recovery of the electrolyte comprises grinding the battery under an inert atmosphere. The conditions in which this step a) is carried out are the same as for step a) of the method for recycling electrolyte of the present invention according to the second embodiment described above.

Next, as is shown in FIG. 4, step d) of adding the organic solvent of addition is carried out. Step d) of adding the organic solvent of addition may be carried out during step a) of recovery of the electrolyte by grinding the battery under an inert atmosphere or just after this step.

Then step c) of filtration (F1) is carried out after step d) of adding the organic solvent of addition. Thus, the liquid phase that contains the electrolyte is separated from the solid phase that contains the rest of the battery.

The liquid phase is then treated by adding water (step b)). This is followed by step e) of decanting the liquid phase to obtain, on the one hand, the organic phase comprising the organic solvents of the electrolyte and the solvent of addition and, on the other hand, the aqueous phase, containing the lithium salts.

The organic phase is then distilled, step f), so as to separate the organic solvents of the electrolyte and the organic solvent of addition.

As for the aqueous phase, obtained in step e), the anion A of the lithium salt is precipitated and then filtered (filtration F2) in step g).

To obtain the lithium salt, in step g) a new filtration (F3) is undertaken and addition of at least one carbonate salt or at least one phosphate salt, or $CO_2$ (by bubbling) to form a lithium carbonate, in step h).

The carbonate salts may be selected from calcium carbonate, sodium carbonate, ammonium carbonate or a mixture of two or more of the latter.

The phosphate salts may be selected from calcium phosphate, sodium phosphate, ammonium phosphate or a mixture of two or more of the latter.

The lithium salt formed and the water are separated in step h) by filtration (F3). The water is reused during step b) before the decanting step e).

In all the embodiments of the method for recycling an electrolyte according to the invention, the organic solvent of addition and the water can be reused in the method of recycling in order to reduce the cost of the method.

Moreover, the decanting step e) may be repeated several times for further purification of the organic solvents of the electrolyte.

Another object of the present invention is a method for recycling Li-ion batteries. This method may comprise any one of the embodiments of the method for recycling the electrolyte of a Li-ion battery according to the present invention.

As is shown in FIG. 4, this method for recycling a Li-ion battery further comprises a step a1) of washing the solids obtained after extraction of the electrolyte and in particular the electrodes of the battery obtained after filtration (F1).

In fact, the electrodes contain lithium derived from the electrolyte.

After washing, the solids are separated from the liquid phase by filtration (F4) in step a2) for separating the liquid phase from the solid phase.

During the following step, step a3), the filtrate (the liquid phase) obtained in step a2) is mixed in the decanting step e) for recycling the electrolyte.

The methods according to the present invention may be applied for Li-ion batteries whose electrolyte is composed of a binary or ternary mixture of cyclic carbonates selected from ethylene carbonate, propylene carbonate, butylene carbonate, linear or branched carbonates selected from dimethyl carbonate, diethyl carbonate, ethyl methyl carbonate and dimethoxyethane, in which a lithium salt is dissolved, selected from lithium hexafluorophosphate, lithium trifluoromethanesulfonate, lithium perchlorate and lithium tetrafluoroborate.

For better understanding of the invention, an embodiment of the latter will now be described, purely for illustration, and nonlimiting.

EXAMPLE 1

This example describes the method for recycling the electrolyte of a Li-ion battery of the present invention according to the first embodiment shown in FIG. 3.

The Li-ion battery electrolyte consisting of ethylene carbonate (EC), dimethyl carbonate (DMC) and lithium hexafluorophosphate $LiPF_6$ (1M) is recovered after cutting the battery open under a high-pressure water jet, typically of the order of 6000 bar. The electrolyte is thus cleaned with the volume of water used during cutting.

Next, the liquid phase is separated from the solid phase by filtration (F1).

Then the liquid phase is treated with an organic solvent of addition, dichloromethane (DCM), the volume of which is adjusted to allow two distinct phases to appear. Thus, for a solution comprising 10 mL of water and 10 mL of electrolytic solution, 10 mL of dichloromethane (DCM) is added, and immediate demixing is observed between the organic phase comprising the solvents of the electrolyte and the aqueous phase comprising the lithium salt.

Figure 5:
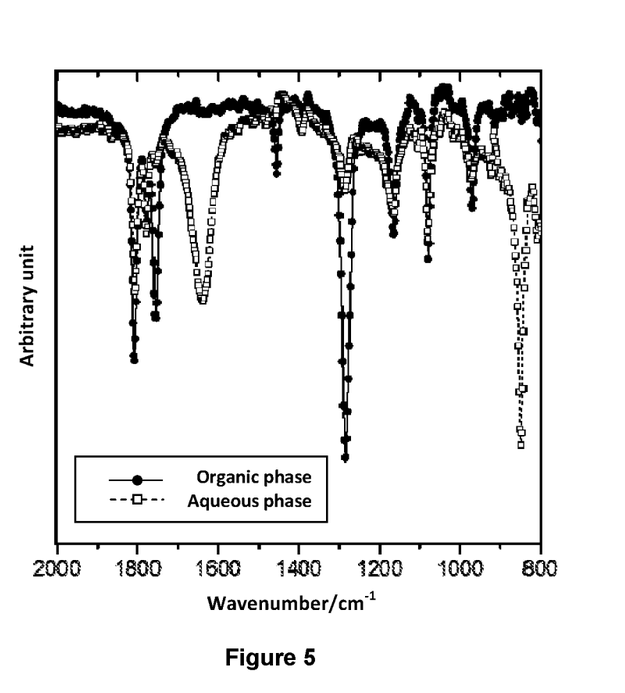
FIG. 5 shows the infrared spectrum of the aqueous phase and organic phase obtained in step e) of the method of the invention diluted in a matrix of acetonitrile, and obtained in example 1.

FIG. 5 shows the infrared spectrum of the aqueous solution and of the organic solution diluted in a matrix of acetonitrile. In this figure, we observe, for the aqueous phase, the band characteristic of the vibration P—F of the hexafluorophosphate anion ($PF_6^-$) situated at 848 $cm^{-1}$. The other bands can be attributed to water (1638 $cm^{-1}$) and to residual presence of the organic solvents, EC and DMC, of the electrolyte. For the spectrum of the organic phase, we observe absence of the bands characteristic of the hexafluorophosphate anion ($PF_6^-$) and of water, but presence of the bands characteristic of EC and DMC. This indicates that demixing allowed the organic solvents to be separated from the hexafluorophosphate anion ($PF_6^-$).

In parallel, it was verified by inductively coupled plasma-optical emission spectrometry (ICP-OES) that lithium is also transferred to the aqueous phase.

After the decanting step, the organic phase and the aqueous phase are treated independently.

Figure 6:
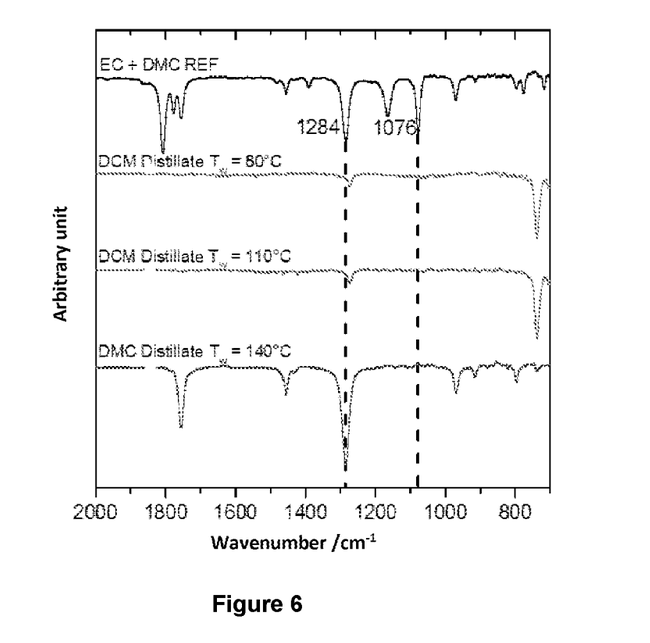
FIG. 6 shows the infrared spectrum of a mixture of ethylene carbonate and dimethyl carbonate and distillates obtained after the distillation in example 1.

The organic phase was distilled at different temperatures and at atmospheric pressure. FIG. 6 shows the infrared spectrum of the EC-DMC mixture and of the distillates obtained from the EC-DMC-DCM solution. A distillate free from dichloromethane (DCM) is obtained for distillation at a temperature 110° C. Then, at a temperature 140° C., DMC can be recovered selectively without the presence of EC. Thus, each product is recovered selectively and without degradation.

The aqueous phase is treated by adding pyridine, in equimolar amount of the $PF_6^-$ anions, then filtered (filtration F2) in order to form pyridinium hexafluorophosphate ($C_5H_5NHPF_6$), an intermediate in the synthesis of lithium hexafluorophosphate ($LiPF_6$).

Then the aqueous solution is treated with a phosphate salt, $Na_3(PO_4)$, and after filtration (F3), the lithium salt and water are obtained.

EXAMPLE 2

This example describes extraction of the organic compounds from the water for grinding a lithium-ion battery after cutting the latter open under a high-pressure water jet.

The electrolyte is washed with the volume of water used during cutting.

The liquid part is extracted from the solid part by filtration.

The liquid part is then treated with dichloromethane (DCM), the volume of which is adjusted to a ratio of a tenth. Thus, for a solution comprising 100 mL of water for grinding, 10 mL of DCM is added, and a two-phase solution is observed (demixing/decanting) consisting of an aqueous phase and an organic phase.

Table 1 below shows the distribution of the concentration of the carbonates in the aqueous phase and in the organic phase.

TABLE 1

Distribution of the concentration of the carbonate species (%) in the aqueous phase and the organic phase after a step of demixing with DCM.

| Solvent of addition | Phase | DMC % | EMC % | DEC % | EC % | [PC] % |
|---|---|---|---|---|---|---|
| DCM | $\varphi_{Aqueous}$ | 19 | 16 | 7 | 17 | Nd* |
|  | $\varphi_{Organic}$ | 81 | 84 | 93 | 83 | Nd |

*Not detected
DMC = dimethyl carbonate
EMC = ethyl methyl carbonate
DEC = diethyl carbonate
EC = ethylene carbonate
[PC] = propylene carbonate.

Analysis by chromatography (GC) indicates a concentration of carbonates in the organic phase above 80% after a demixing step.

Repetition of the demixing step in three steps makes it possible to obtain a concentration of the carbonates in the organic phase that is above 99%.

Figure 7:
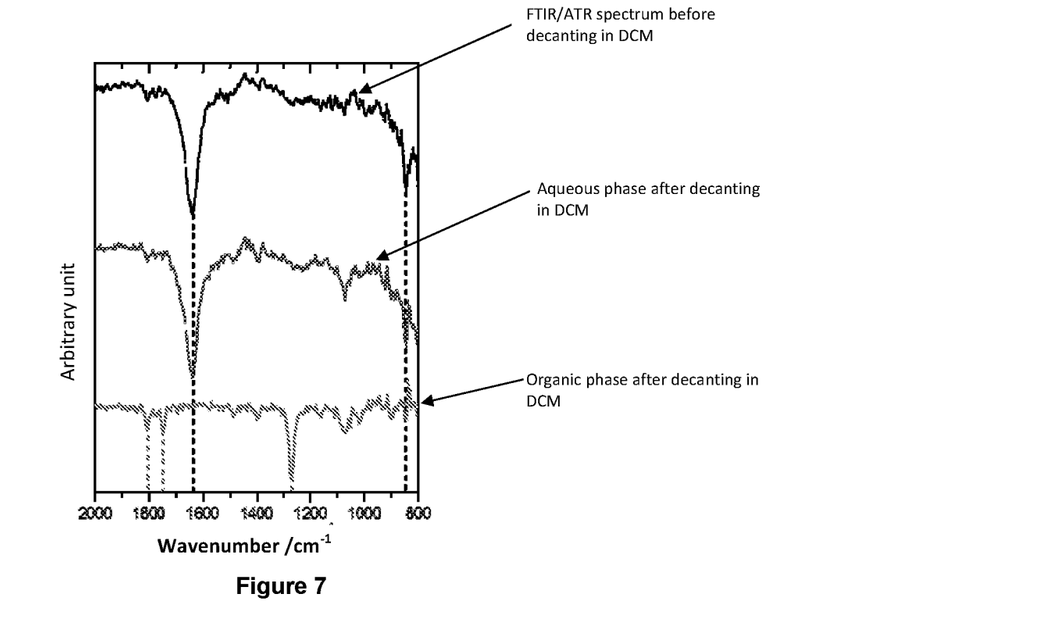
FIG. 7 shows, from top to bottom, the FITR/ATR spectra of the phase obtained in example 2 before step e), of the aqueous phase obtained in example 2 after step e) and of the organic phase obtained in example 2 after step e)

In parallel, measurement by ICP-OES showed that the lithium is exclusively in the aqueous phase. Just like lithium, the $PF_6^-$ anions are completely in the aqueous phase, giving evidence of the presence of the characteristic band P—F (located at 848 cm$^{-1}$) in water (before and after demixing) and its absence in the organic phase, as can be seen in FIG. 7, which shows the FTIR/ATR spectra (decanting in step e)) of these phases before and after demixing in DCM.

Figure 8:
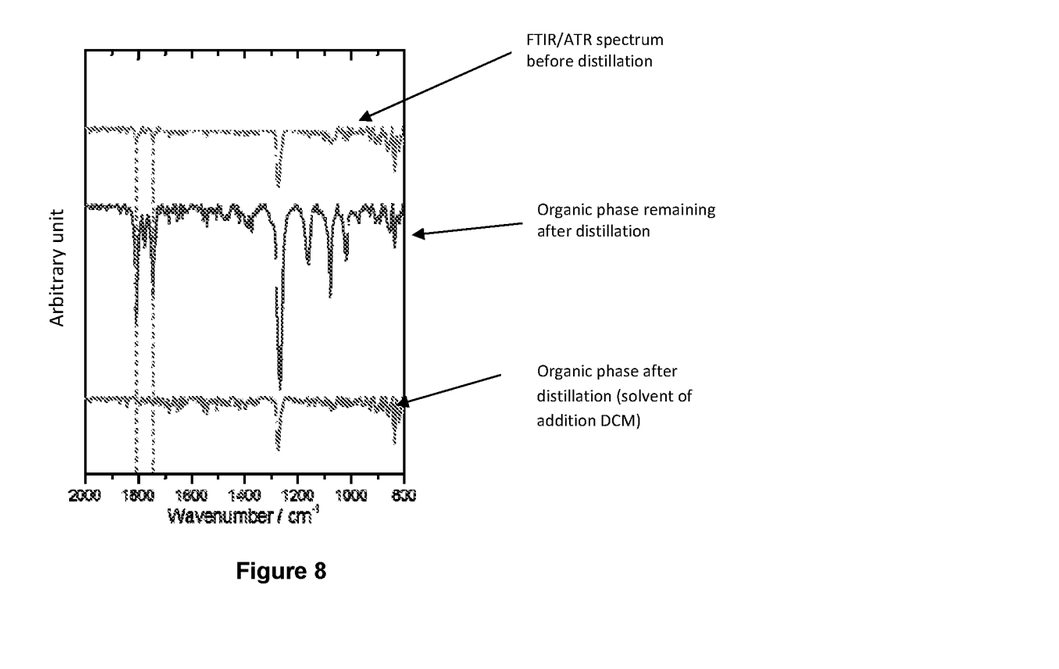
FIG. 8 shows, from top to bottom, the infrared spectrum of the phase obtained in step e) of the method for recycling the electrolyte according to the invention, before the distillation in step f), the infrared spectrum of the organic phase obtained after step f) and the infrared spectrum of the phase containing the solvents after the distillation in step f).

This indicates that demixing made it possible to separate the organic compounds and the $PF_6^-$ anion from the aqueous phase. After decanting, the organic phase and the aqueous phase are treated independently. The organic phase was distilled at 110° C. at atmospheric pressure. FIG. 8 shows, from top to bottom, the infrared spectrum of the organic phase before distillation, then after distillation i), then remaining in the flask. It can be seen that the distillate is pure dichloromethane, whereas the carbonates are concentrated in the heating flask. Thus, each product is recovered selectively and without degradation.

The aqueous phase is neutralized with pyridine, in equimolar amount of the $PF_6^-$ anions, in order to form pyridinium hexafluorophosphate ($C_5H_5NHPF_6$), an intermediate in the synthesis of $LiPF_6$. Then the aqueous solution is treated with ammonium phosphate to allow precipitation and recovery of the lithium.

The invention claimed is:

1. A method for recycling an electrolyte containing a lithium salt of formula LiA, where A represents an anion selected from $PF_6^-$, $CF_3SO_3^-$, $BF_4^-$, $ClO_4^-$ and $[(CF_3SO_2)_2]N^-$ of a Li-ion battery, comprising the following steps:
   a) adding water to the electrolyte whereby obtaining a liquid phase which is a mixture of an aqueous phase and an organic phase;
   b) adding an organic solvent of addition to the liquid phase obtained in step a), whereby obtaining an aqueous phase containing the lithium salt and an organic phase containing electrolyte solvents and the organic solvent of addition;
   c) decanting to separate the aqueous phase from the organic phase;
   d) distilling the separated organic phase obtained in step c) to separate the solvents of the electrolyte and the organic solvent of addition;
   e) precipitating the anion A of the lithium salt by addition of pyridine and then filtering (F2);
   f) adding at least one carbonate salt and/or of at least one phosphate salt to the filtrate obtained in step r) and then filtering (F3), whereby a lithium salt and water are obtained.

2. The method as claimed in claim 1, wherein step a) is carried out at the same time as a step of processing the battery to recovery the electrolyte by cutting up the battery under a high-pressure water jet.

3. The method as claimed in claim 1, wherein the organic solvent of addition is selected from:
   dichloromethane,
   acetates, selected from butyl acetate, hexyl acetate, ethyl acetate, tert-butyl acetate;
   ethers, selected from 2-methoxy-2-methylpropane, 2-ethoxy-2-methylpropane, 2-methoxy-2-methylbutane, and
   ketones.

4. The method as claimed in claim 1, wherein the organic solvent of addition obtained after distillation of the organic phase in step d) is recycled in step b) of a next carrying out of the method.

5. The method as claimed in claim 1, wherein the decanting step c) is repeated.

6. The method as claimed in claim 1, wherein the water obtained in step f) is recovered to be reused in step a) of a next carrying out of the method.

7. A method for recycling a Li-ion battery, wherein the method comprises a step of recycling the electrolyte of the Li-ion battery as claimed in claim 1.

8. The method as claimed in claim 1, wherein the electrolyte is composed of a binary or ternary mixture of cyclic carbonates selected from ethylene carbonate, propylene carbonate and butylene carbonate, linear or branched carbonates selected from dimethyl carbonate, diethyl carbonate, ethyl methyl carbonate and dimethoxyethane, in which a lithium salt is dissolved, selected from lithium hexafluorophosphate, lithium trifluoromethanesulfonate, lithium perchlorate and lithium tetrafluoroborate.

9. The method as claimed in claim 3, wherein the ketone is butanone.

10. The method as claimed in claim 1, wherein the method further comprises:
   before step a), a step of processing the Li-ion battery to recover an electrolyte that it contains, and
   after step a), a step of filtering (F1) to separate a liquid phase containing the electrolyte from a solid phase comprising residues of the battery,
   and wherein step b) is carried out on the liquid phase obtained in the step of filtering (F1).

11. The method as claimed in claim 10, wherein the step of processing the Li-ion battery is carried out by grinding the battery in a chamber under an inert atmosphere.

12. The method as claimed in claim 10, wherein:
   the step of processing the Li-ion battery is a step of grinding the battery under an inert atmosphere;
   step of adding the organic solvent of addition is carried out either during or just after the step of processing the Li-ion battery;
   filtering (F1) is carried out after step b), and
   step a) of adding water is carried out after of filtering (F1).

13. A method for recycling a Li-ion battery, wherein the method comprises a step of recycling the electrolyte of the Li-ion battery as claimed in claim 10.

14. The method as claimed in claim 13, wherein the method further comprises a step a1) in which solids from the solid phase obtained after filtering (F1) are washed with water, followed by a step a2) of filtering (F4) for separating the liquid phase from the solid phase and a step a3) of mixing the liquid phase obtained in step a2) before the decanting step c) of the method for recycling the electrolyte.

* * * * *